(12) United States Patent
Ramarao

(10) Patent No.: US 9,682,590 B1
(45) Date of Patent: Jun. 20, 2017

(54) PRINTED DOCUMENT SECURITY

(71) Applicant: AMAZON TECHNOLOGIES, INC., Reno, NV (US)

(72) Inventor: Pradeep Ramarao, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 893 days.

(21) Appl. No.: 14/028,180

(22) Filed: Sep. 16, 2013

(51) Int. Cl.
*G06K 5/00* (2006.01)
*B42D 15/00* (2006.01)

(52) U.S. Cl.
CPC .................................. *B42D 15/00* (2013.01)

(58) Field of Classification Search
USPC ..................... 235/375, 382, 462.01
See application file for complete search history.

(56) References Cited

U.S. PATENT DOCUMENTS

| | | | | |
|---|---|---|---|---|
| 5,598,279 A * | 1/1997 | Ishii | ...................... | G06Q 10/10 358/402 |
| 6,178,243 B1 * | 1/2001 | Pomerantz | ............ | G06F 21/606 358/296 |
| 7,578,436 B1 * | 8/2009 | Kiliccote | .............. | G06F 21/606 235/375 |
| 8,590,775 B2 * | 11/2013 | Hamada | .................. | G06T 11/00 235/375 |
| 8,964,231 B2 * | 2/2015 | Kakutani | ............. | G03G 21/046 235/375 |
| 2002/0023055 A1 * | 2/2002 | Antognini | .............. | G06K 1/121 705/40 |
| 2007/0176000 A1 * | 8/2007 | Cattrone | ................ | G06K 1/121 235/462.01 |
| 2008/0067230 A1 * | 3/2008 | Silverbrook | ......... | B41J 2/17503 235/375 |
| 2008/0147790 A1 * | 6/2008 | Malaney | ................ | G06Q 10/00 709/203 |
| 2010/0074443 A1 * | 3/2010 | Ishii | ........................ | G09C 5/00 380/243 |
| 2010/0140362 A1 * | 6/2010 | Tokumaru | ............. | G06T 1/0021 235/494 |
| 2010/0161993 A1 * | 6/2010 | Mayer | ..................... | G06F 21/64 713/178 |
| 2011/0121066 A1 * | 5/2011 | Tian | ....................... | G06K 19/14 235/375 |
| 2011/0128566 A1 * | 6/2011 | Eum | .................. | H04N 1/00846 358/1.14 |
| 2013/0046995 A1 * | 2/2013 | Movshovitz | .......... | H04L 9/0618 713/189 |

* cited by examiner

Primary Examiner — Tuyen K Vo
(74) Attorney, Agent, or Firm — Lindauer Law, PLLC

(57) ABSTRACT

A printed document includes encoded content. The at least some content of the printed document is acquired and securely communicated to a support service. Information received from the support service is used to present user-readable content on a display. One or more portions of the encoded content are decoded for inclusion with the user-readable content, in accordance with an authorization of the user. Printed documents having encoded content may be distributed without security concerns due to the machine-based, authorization-driven nature of respective methods and apparatus.

20 Claims, 11 Drawing Sheets

PRINTED DOCUMENT SECURITY

BACKGROUND

Users prepare various documents including sensitive content intended only for a particular recipient or recipients. Security may be a concern if such a document cannot be delivered personally to the intended recipient, if there is no assurance that the document will be timely destroyed, and so forth. Business managers, technical developers, bankers, and numerous other persons seek to disseminate sensitive information using paper documents where document security is difficult or impractical.

Figure 1:
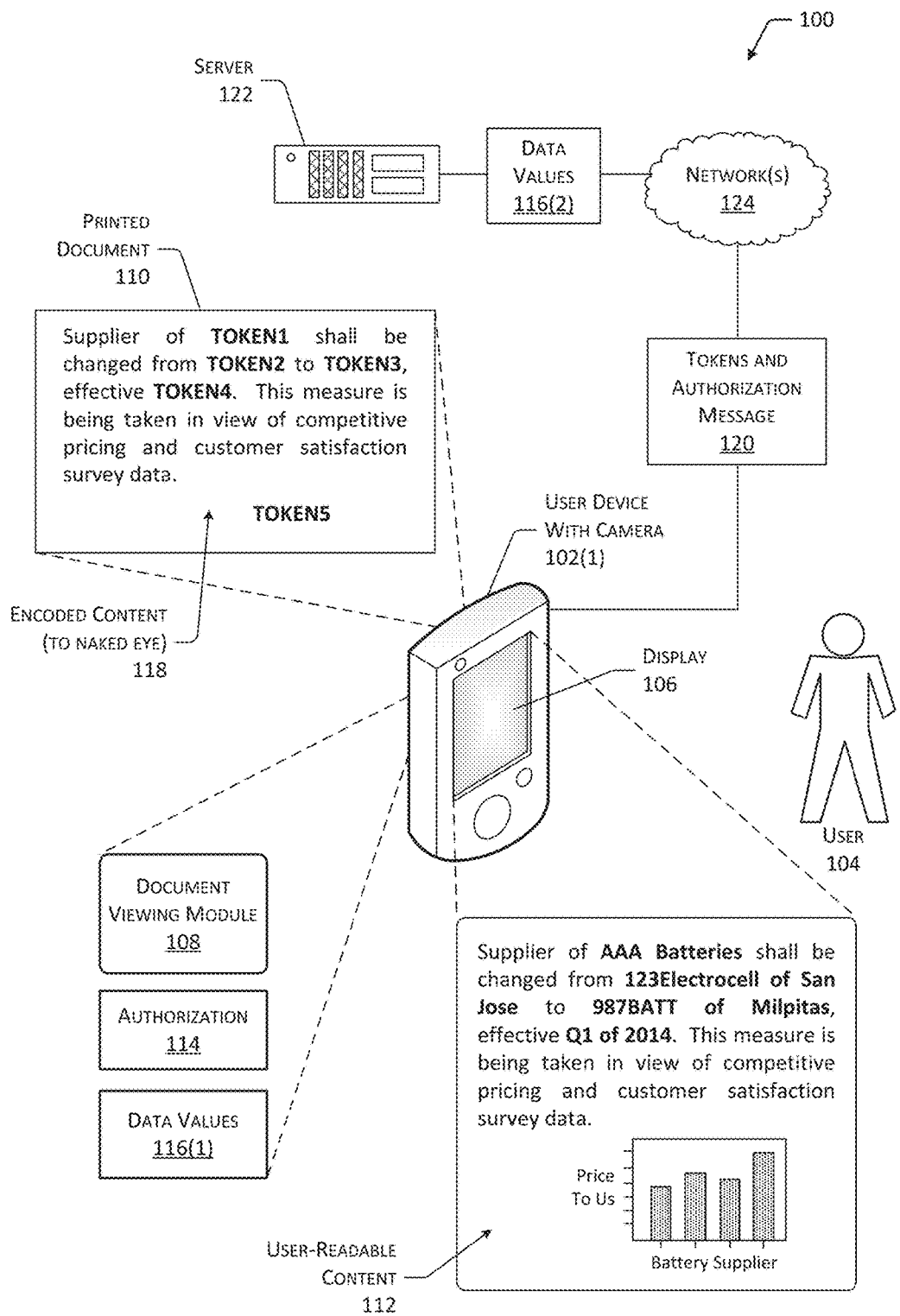
FIG. 1 is a block diagram of a system where user-readable content is derived from a printed document having at least a portion of content represented by tokens.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

People in various endeavors produce printed documents that include sensitive information. Business income or sales statements, research and development data, market studies, and a host of other document types may include information intended for only one or more specific recipients. In one case, a printed document may be produced by a user employing word processing software or another application. In another instance, a printed report may be automatically generated or compiled from one or more sources of sensitive information. Other document generation scenarios may also be used, of course.

Security with regard to printed documents may be a concern in an office environment, manufacturing facility, or other situation where it is difficult or impossible to fully ensure that unauthorized persons will not view sensitive content. Similarly, concerns may arise with regard to the timely shredding of a sensitive document once the contents have been read by the intended audience. Furthermore, printed documents are subject to being misplaced, recycled with non-sensitive matter, lost or forgotten in public places during business travel, confiscated by foreign customs agents, and so on.

In one example, a document may be produced where specific notations or markers are used to tag sensitive pieces of information for substitution by respective placeholders or "tokens". A computer application then replaces each of the tagged pieces of information with a distinct, predefined token. A data structure or other computer-accessible construct stores each sensitive piece of information—known as a data value—and the respective token associated therewith. For example, one specific token for each data value. In another instance, a single token may be associated with two or more data values. The encoded document, including both user-readable portions and tokens placed therein accordingly, may be printed and distributed to the intended recipients. Thus, each token is referred to as an encoded portion within the document.

Continuing the present example, a recipient of the printed document now acquires an image of the printed document having tokens that represent the encoded portions, using a digital camera. The digital camera may be part of a tablet computer, an e-book reader, a laptop computer, wearable computer, or another suitable user device. An application or "software" of the user device identifies the respective tokens within the image and securely sends them, as well as an authorization, to a server or another device.

In the present example, the server responds by verifying the authorization. The authorization includes information corresponding to that particular user's privilege to access or view sensitive information that is represented by encoded content—in this case, by way of the respective tokens. Thereafter, respective data values are retrieved from the data structure. In one instance, selected ones of the data values are retrieved in accordance with the user's security level. Thus, each sensitive piece of information may be provided or withheld, respectively, based on the security level of the requesting user. Those data values within the user's authorization are then securely communicated from the server to the user device.

Concluding the present example, the user device then generates user-readable content, including the data values received from the server. The user device then presents the user-readable content on a display of the user device. The data values and the user-readable content may be deleted from the user device when the current presentation has ended, after a period of time elapses, or in accordance with another stratagem or event.

In another example, a document may be produced where the sensitive pieces of information are tagged for encryption. An application then encrypts each of the tagged information portions in accordance with a predetermined, key-based encryption scheme. A document identifier may also be added to the document and appear printed on the page. The document identifier and the encryption key or keys are securely communicated to a server for storage. The encoded document, including both user-readable or non-encoded portions, and the encrypted or encoded portions, may be printed and distributed to the intended recipients.

In the present example, a recipient of the printed document acquires an image of the printed document using a digital camera of a user device. An application of the user device identifies the document identifier within the image and sends it, as well as an authorization, to the server. The server verifies the authorization and sends the encryption key or keys to the user device. The user device generates user-readable content, including user-readable portions acquired from the printed document, and those portions that are decoded using the encryption key or keys. The user device then presents the user-readable content on a display of the user device. The encryption key(s) and the user-readable content may be deleted after viewing the user-readable content, after an elapsed time, and so forth.

In yet another example, a document may be produced where the sensitive pieces of information have been replaced with respective tokens, or alternatively, encrypted, as respectively described above. The encoded document may be printed and distributed to the intended recipients. A recipient then images the printed document using a camera and sends the image of the entire document, as well as an authorization, to a server. The server responds by decoding the encoded portions in accordance with the user's authorization and provides a decoded document back to the user's device. The user's device then presents the user-readable content on a display. Other suitable methods and processes may also be used.

A user may generate a document, tagging sensitive portions of textual information, graphic objects, charts, photographic images, and so on, therein for encoding by way of tokens, encryption, or another suitable method. The tagging scheme may also denote one or more security levels that apply to respective pieces of sensitive information. An automated service then encodes each of the tagged information portions accordingly, storing information as needed for later decoding. An encoded document is thus generated, and may now be printed and distributed to the intended recipients.

A recipient of the printed document images the content using a camera of a user device, such as a smart phone, tablet computer, or another suitable apparatus. Information encoded in the image, such as tokens, a document identifier, encrypted text, or the image as a whole, are sent to a server or similar service. An authorization, security level code, or the like may also be sent to the server.

The server then provides information back to the user device such that some or all of the encoded content, as well as user-readable portions of the original printed document, may be displayed on the user device in a user-readable form, in accordance with the user's authorization. The information provided by the server—data values associated with the tokens, an encryption key or keys, decoded portions, and so forth—may be deleted from the user device in accordance with a predefined event or scheme. Respective variations on the foregoing may also be used in accordance with the methods, devices and systems described herein.

Such conversion of the encoded portions and the presentation of user-readable content on a user device may be performed with sufficient expediency that little or no delay is perceptible to the user. Thus, a natural and non-distracting presentation of both the sensitive and non-sensitive content of a printed document may be made.

FIG. 1 depicts views of an illustrative system 100. The system 100 includes particular elements and operations performed by each. The system 100 is illustrative and non-limiting in nature, and other systems or respective operations are also contemplated.

A user device 102(1) including a camera is associated with a user 104. As depicted, the user device 102(1) is a cellular or "smart" phone configured to perform various functions in accordance with respective executable program code, applications, or modules. Other suitable user devices 102 may also be used. The user device 102(1) also includes a display 106 that may be used to present text, digital photographs, computer-generated graphics, or other indicia to the user 104. The display 106 may also be touch-sensitive and serve as a user input device in response to user 104 touches, gesturing, and the like.

The user device 102(1) may include a document viewing module 108. The document viewing module 108 may include executable code within a computer-readable storage media, electronic circuitry, or other suitable constituency. The document viewing module 108 is configured to acquire an image of a printed document 110 and to present user-readable content 112 corresponding to, or acquired from, the printed document 110 on the display 106. The document viewing module 108 may also be configured to identify tokens within an image of the printed document 110 and to send them to a support service or other entity for decoding.

The user device 102(1) may also include an authorization 114 stored in computer-readable storage media. The authorization 114 may include a digital or electronic certificate, one or more security level values, an encrypted identification or serial number, or other information indicative of a security level or clearance of the user 104. The authorization 114 includes information or values related to the user 104 privileges or authority to view sensitive information. The user device 102(1) may further include data values 116(1) received from another computing device or service, as described further below.

Also depicted is an illustrative example of the printed document 110 introduced above. The printed document 110 includes encoded content 118, having user-readable portions (i.e., non-encoded, or plain text), and five encoded portions in the form of respective tokens. Specifically, TOKEN1, TOKEN2, TOKEN3, TOKEN4 and TOKEN5 are depicted, each representing a sensitive piece of information. Thus, each of the five tokens (TOKEN1-TOKEN5) is a placeholder for an associated item or data value 116 that was tagged for encoding or "tokenization" when the printed document 110 was being generated. The tokens may be represented using machine-readable codes such as an optical barcode, a string of printed characters, and so forth. For example, the tokens may be randomly generated eight digit integers. In another instance, the tokens are provided as respective graphical images or symbols. The encoded content 118 illustrates what is seen by the naked eye of the user 104 when viewing the printed document 110.

Illustrative and non-limiting operation of the system 100 is as follows: the user 104 receives the printed document 110 directly from its original author, by way of a mailing or delivery service, or in another suitable way. The user 104 acquires an image of the printed document 110 using the camera of the user device 102(1). The image of the printed document 110 is processed by the document viewing module 108 so as to identify—that is, extract or parse—the five respective tokens TOKEN1-TOKEN5 therein.

The document viewing module 108 then sends the five tokens and the authorization 114 as a message 120 to a server 122 by way of secured communication, such as secure sockets layer (SSL), transport layer security (TLS), or another suitable protocol or method. In one example, the server 122 is a computing device configured to implement one or more services. Thus, the server 122 can provide one or more services using respective functional modules, executable program code, or other resources.

The message 120 is routed to the server 122 by way of one or more networks 124. The networks 124 may include, or be defined by, the Internet, a local-area network (LAN), a wide-area network (WAN), and so on. The server 122 receives the message 120 and verifies or validates the authorization 114 of the user 104. The server 122 may also determine a security level or clearance value of the user 104 with respect to a predefined security hierarchy. For purposes of the present illustration, the user 104 is understood to have sufficient authorization 114 to view the decoded content of the printed document 110 in its entirety.

The server 122 then retrieves respective data values 116 associated with the five tokens TOKEN1-TOKEN5. Thus, the server 122 retrieves five distinct data values 116 from a data structure or other computer-accessible storage, as previously populated during the encoding of the printed document 110. The five respective data values 116 collectively define data values 116(2), which are sent from the server 122 to the user device 102(1) using secured communication by way of the network(s) 124.

The user device 102(1) receives the data values 116(2), and adds them to the data values 116(1). The document viewing module 108 generates the user-readable content 112, using the five corresponding data values 116 to replace the respective tokens TOKEN1-TOKEN5. The document viewing module 108 then presents the user-readable content 112 on the display 106 of the user device 102(1), for viewing by the user 104.

As depicted, four of the respective tokens correspond to and replace short strings of textual information in the printed document 110. For instance, the TOKEN1 corresponds to the text "AAA Batteries" as provided in the original document, and so on. TOKEN5 corresponds to a bar chart—a type of graphic image—that is presented in a lower area of the user-readable content 112. In this way, the printed document 110 is not subject to being "hacked", decoded, or maliciously altered in the same way that an electronic media file may be. Information security is therefore centralized at the server 122 and by way of the authorization 114. The printed document 110 may therefore be distributed in an office environment or other setting without significant security concerns.

The document viewing module 108 may also be configured to delete the user-readable content 112 and the data values 116(2) in accordance with a predetermined methodology. In one implementation, the user-readable content 112 and the data values 116(2) are deleted after a single presentation on the display 106. In another implementation, the user-readable content 112 and the data values 116(2) are deleted after a period of time elapses (e.g., 1 week). In another implementation, the document viewing module 108 may also be configured to prevent printing, copying, transference or other unauthorized use of the user-readable content 112, or the data values 116(2), or both. Other suitable deletion and protection strategies may also be used.

In the illustrative example above, a camera of the user device 102(1) is used to capture or acquire an image of the printed document 110, from which the tokens are identified and extracted for communication to the server 122. Thus, the encoded portions are identified and communicated by an optoelectronic mechanism. In another example, the user 104 may verbally recite the specific tokens into a microphone of the user device 102(1). In this way, the tokens are acquired from the printed document 110 and communicated to the server 122 by way user 104 speech inputs. Other methods for acquiring content from the printed document 110 may also be used.

Figure 2:
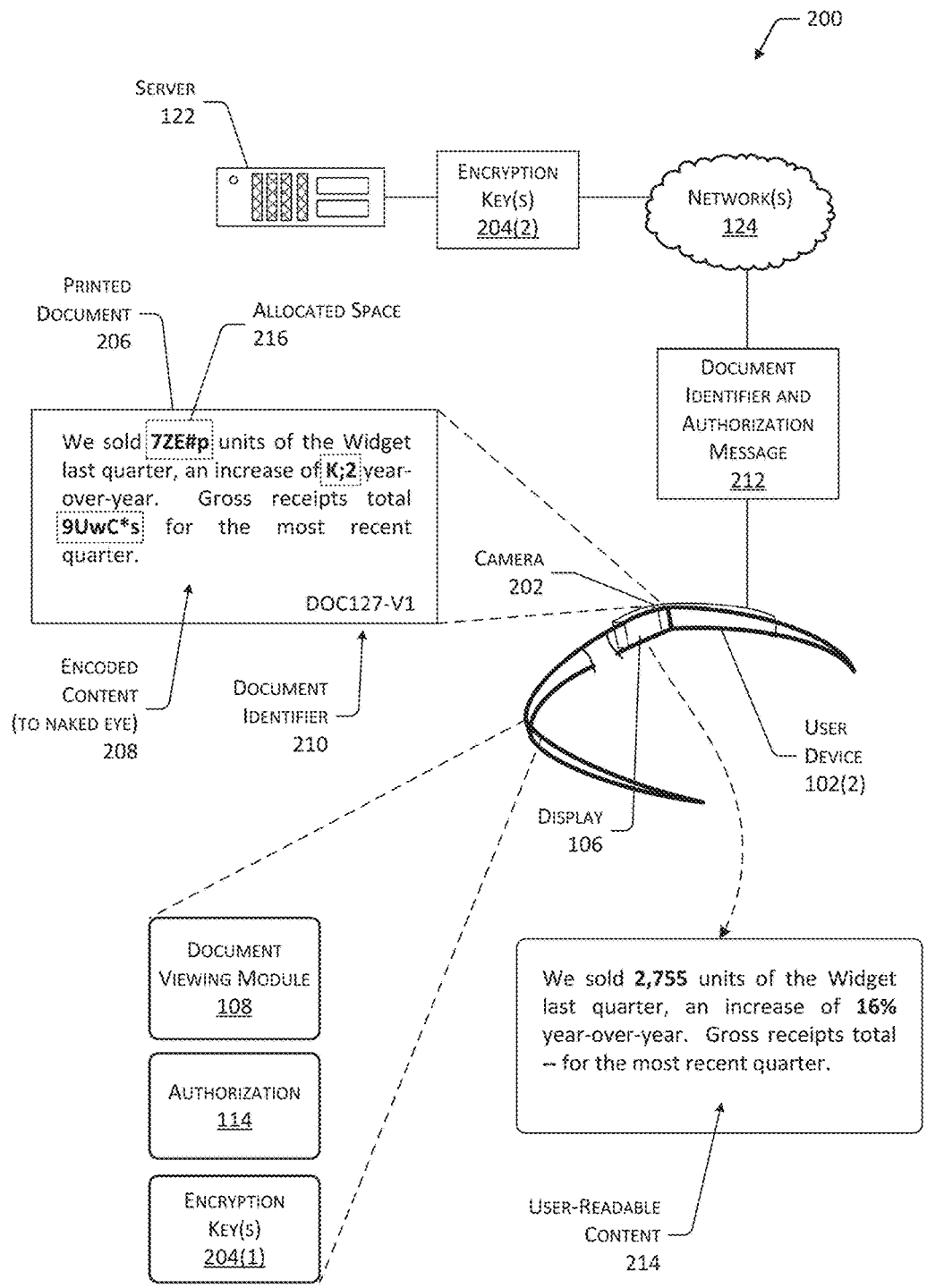
FIG. 2 is a block diagram of a system where user-readable content is derived from a printed document having encrypted content.

FIG. 2 depicts views of an illustrative system 200. The system 200 includes particular elements and operations performed by each. The system 200 is illustrative and non-limiting in nature, and other systems or respective operations are also contemplated.

A user device 102(2) is provided in the form of a wearable computing device. The user device 102(2) includes a camera 202 disposed in a forward-looking orientation. The user device 102(2) also includes a display 106 positioned in or near the line-of-sight of the user 104 when the user device 102(2) is being worn during normal use. The display 106 may be used to present text, digital photographs, graphics, and the like. Other suitable user devices 102 may also be used.

The user device 102(2) may include a document viewing module 108. The document viewing module 108 is configured to perform operations as described below. The user device 102(2) may also include an authorization 114. The user device 102(2) may also include one or more encryption keys 204(1) as received from a server 122 or other service.

Also depicted is an illustrative example of a printed document 206. The printed document 206 includes encoded content 208, having user-readable portions, and 3 encoded portions in the form of encrypted text or strings. Specifically, encrypted text portions "7ZE#p", "K;2", and "9UwC*s" are depicted, each encoding a sensitive piece of information. Therefore, 3 respective pieces of sensitive information were tagged for encoding when the printed document 206 was generated. The encoded content 208 illustrates what is seen by the naked eye of the user 104. The printed document 206 also includes a document identifier 210, which was added during the encoding of the original document.

The printed document 206 may include a digital signature, or a link or a computer-accessible address to a digital signature. In another instance, a watermark is included on the printed document 206. In yet another instance, a computer readable storage medium, radio frequency identification (RFID) device or tag, or other device has been affixed to or integrated within the printed document 206. Other suitable security or authentication measures may also be used.

Operation of the system 200 is illustrated as follows: the user 104 receives the printed document 206 by way of a delivery service, and so forth. The user 104, wearing the user device 102(2), acquires an image of the printed document 206 using the camera 202. The image of the printed document 206 is processed by the document viewing module 108 so as to identify the document identifier 210. The document viewing module 108 then sends the authorization 114 and the document identifier 210 as a message 212.

The message 212 is routed to the server 122 by way of the network(s) 124. The server 122 receives the message 212 and verifies or validates the authorization 114 of the user 104. For purposes of the present illustration, the user 104 is understood to have authorization 114 to view the first 2 encoded portions of the printed document 206, but not to view the third encoded portion depicted by the encrypted text "9UwC*s".

The server 122 then retrieves respective encryption keys 204 used to decode the encrypted text portions "7ZE#p" and "K;2". In particular, the server 122 retrieves 2 encryption keys 204 from computer-accessible storage, as previously used during the encoding of the printed document 206. The 2 respective encryption keys 204, collectively defining encryption keys 204(2), are securely communicated from the server 122 to the user device 102(2).

The user device 102(2) receives the encryption keys 204(2), and adds them to storage with the encryption keys 204(1). The document viewing module 108 may now decode the first and second encoded portions of the printed document 206 using the encryption keys 204(2) just received. The document viewing module 108 may also substitute a placeholder for the third encoded portion, as depicted by "--". Other suitable placeholders, blank spaces, or other indicators may also be used.

The document viewing module 108 now generates or assembles user-readable content 214 using the user-readable portions of the printed document 206, the decoded first and second encrypted portions, and the placeholder "--". The document viewing module 108 then presents the user-readable content 214 on the display 106 of the user device 102.

The document viewing module 108 may also be configured to delete the user-readable content 214 and the encryption keys 204(2) after a predetermined number of presentations of the user-readable content 214, the arrival of an expiration date, or another suitable method. Additionally, the document viewing module 108 may also be configured to prevent printing, copying, transference or other unauthorized use of the user-readable content 214, or the encryption keys 204(2), or both. Other suitable securities measures may also be used.

In another instance, each of the encrypted text portions is provided within an allocated space 216, which may appear as an outline of a box or as whitespace before and after the encrypted text portion. Each of the allocated spaces 216 is sized to accommodate the sensitive piece of information depicted as encrypted text. Thus, the user-readable content 214 may be generated and presented with the same font size, line spacing, paragraph justification, or other appearance characteristics as the printed document 206. Such a virtual page or "augmented reality" presentation may be less distractive to the user 104 when viewing the user-readable content 214. Other presentation techniques may be used in regard to the user-readable content 214. Allocated spaces 216 may also be used in regard to tokens, as well.

Figure 3:
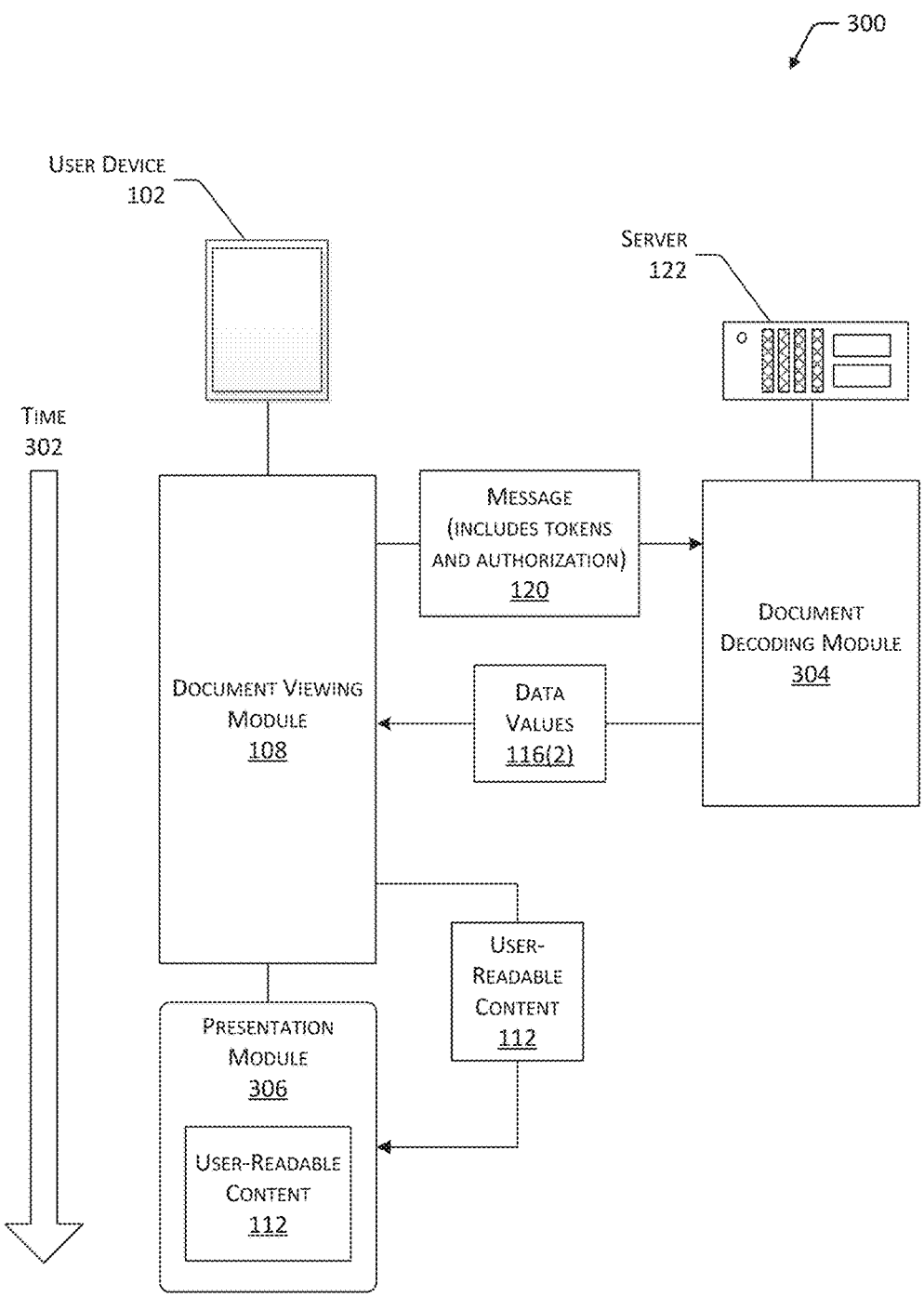
FIG. 3 illustrates a flow diagram including the sending of tokens and an authorization, and the receiving of data values so as to present user-readable content.

FIG. 3 depicts a flow diagram 300 including an exchange of information between a user device 102 and a server 122. In this illustration, time 302 increases down the page as indicated by the arrow. Other respective configurations or constituents may also be used.

To begin, the document viewing module 108 sends a message 120 to a document decoding module 304 of the server 122. The message 120 includes one or more tokens such as, for non-limiting example, TOKEN1-TOKEN5, and the authorization 114. The message 120 may also include a request to provide data values 116 corresponding to each of the tokens, a uniform resource locator (URL) for routing a response to the user device 102, or other information.

For purposes of the present illustration, the document decoding module 304 verifies the authorization 114 and determines that the user 104 is authorized to have all of the tokens decoded. The document decoding module 304 then retrieves the corresponding data values 116 from storage—a data structure, or the like—and collectively bundles them as data values 116(2). The document decoding module 304 then sends the data values 116(2) to the document viewing module 108 of the user device 102.

The document viewing module 108 receives the data values 116(2) and uses them to construct, or generate, user-readable content 112. The user-readable content 112 includes non-encoded portions imaged from the printed document 110, as well as the data values 116 substituted in for the respective tokens. The document viewing module 108 then provides the user-readable content 112 to a presentation module 306 of the user device 102. The presentation module 306 then presents the user-readable content 112 on the display 106 of the user device 102.

Figure 4:
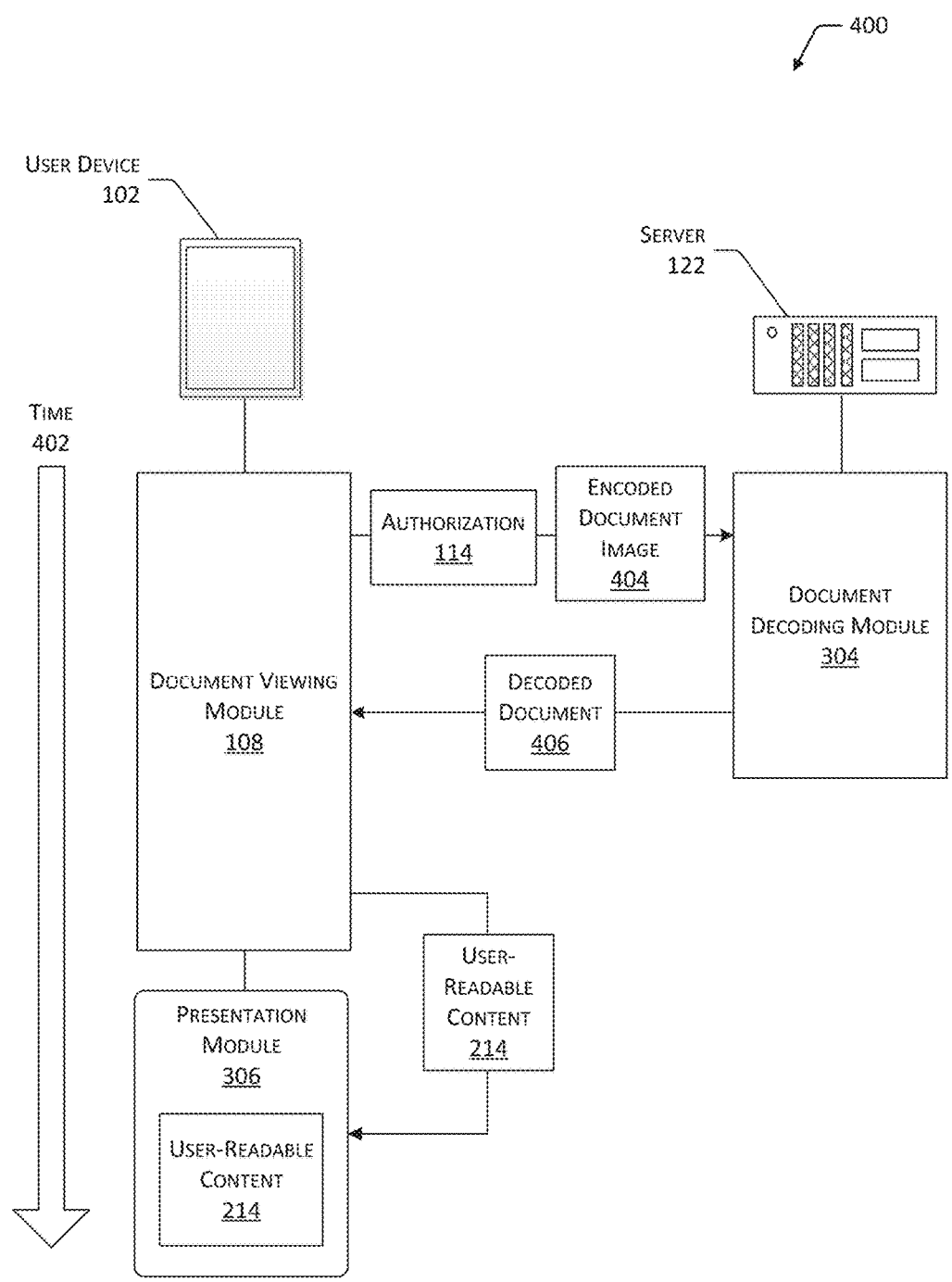
FIG. 4 illustrates a flow diagram including the sending of an encoded document and an authorization, and the receiving of a document with decoded portions so as to present user-readable content.

FIG. 4 depicts a flow diagram 400 including an exchange of information between a user device 102 and a server 122. In this illustration, time 402 increases down the page as indicated by the arrow. Other respective configurations or constituents may also be used.

Initially, the document viewing module 108 sends an encoded document image 404 to the document decoding module 304 of the server 122. The encoded document image 404 may be acquired, for example, by imaging the printed document 206 using the camera 202 of the user device 102. Thus, the encoded document image 404 includes all of the encoded content 208 of the printed document 206, including the encoded portions represented as encrypted text, such as "7ZE#p", "K;2", and "9UwC*s".

The document viewing module 108 also sends the authorization 114 to the document decoding module 304. The document viewing module 108 may furthermore send a request to decode the encoded document image 404, a URL for returning a response to the user device 102, or other data or information.

In the present example, the document decoding module 304 verifies the authorization 114 and determines that the user 104 is authorized to have the entirety of the encoded document image 404 decoded. The document decoding module 304 then retrieves the required encryption keys 204 from storage and uses them to decode the respective encoded (encrypted) portions. In one implementation, the document decoding module 304 may use the document identifier 210 to determine which encryption key or keys 204 are needed. The document decoding module 304 then uses the decoded portions, and the user-readable portions provided within the printed document 206, to generate a decoded document 406. The document decoding module 304 then sends the decoded document 406 to the user device 102.

The document viewing module 108 at the user device 102 receives the decoded document 406 and processes it as needed to generate user-readable content 214. The user-readable content 214 is provided to the presentation module 306, which then presents the user-readable content 214 on the display 106.

In the foregoing illustration, the user device 102 is used to provide an image of the entire printed document 206 to the server 122. The document decoding module 304 then generates a fully decoded document 406 that is provided to the user device 102. Thus, the document decoding module 304 may be configured to identify encoded portions within a document image and perform a majority, or all, of the document decoding process. This operation contrasts with the operations described above, where the user device 102(2) receives the encryption keys 204 and performs the decoding operation locally.

In another implementation, the document decoding module 304 decodes the encrypted portions within the encoded document image 404 and securely communicates just these decoded portions back to the user device 102. Therein, the document viewing module 108 uses the received decoded portions and the user-readable portions provided within the printed document 206 to generate the use-readable content 214. In this way, processing latency may be reduced, or other advantages realized, from the perspective of the user 104. Other suitable variations and methods may also be used.

Figure 5:
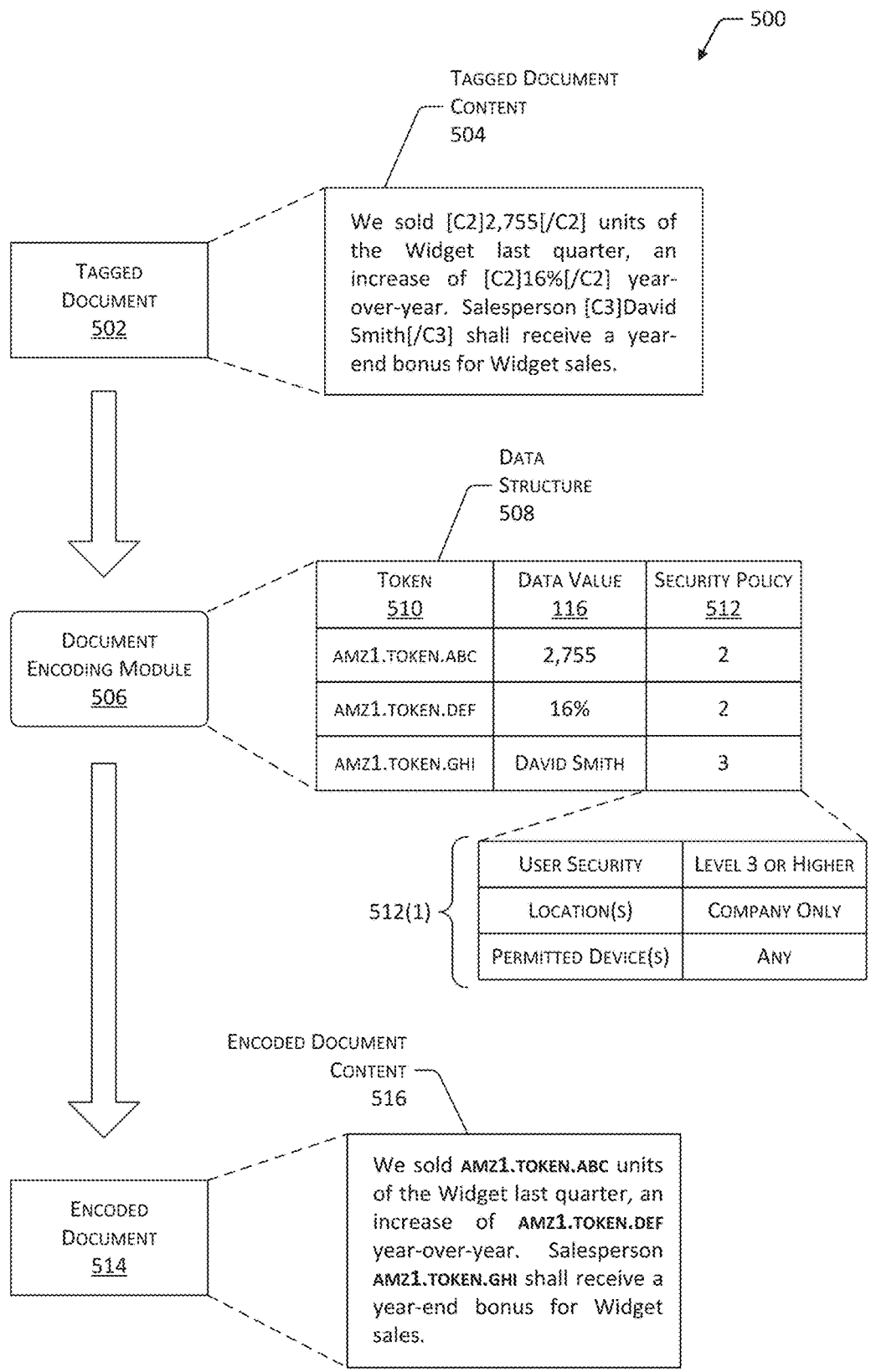
FIG. 5 illustrates a process where a document with tags is encoded using tokens.

FIG. 5 depicts views 500 of resources and a sequence of operations in a document encoding scheme. The views 500 are illustrative and non-limiting in nature, and any number of other examples in accordance with the methods and resources described herein may be defined and used.

A tagged document 502 is depicted, having illustrative tagged document content 504. The tagged document content 504 may be generated by the user 104 using a word processing application on a computing device, or by way of another suitable method. The tagged document content 504 includes user-readable portions, such as "We sold . . . units of the Widget last quarter". The tagged document content 504 further includes sensitive portions that have been tagged by the user 104 for encoding, such as "2,755".

Specifically, the sensitive portion of information "2,755" has been tagged or marked using notations "[C2]" and "[/C2]". In the present non-limiting illustration, these particular notations also convey that a security level of 2 applies to the tagged data value "2,755". That is, the user 104 must have an authorization 114 or a user security level of 2 or greater in order to have this information decoded for viewing upon request. In turn, the information "David Smith" has been tagged at a security level of 3, and so on.

The tagged document 502 is provided to a document encoding module 506. The document encoding module 506 may include executable program code stored on computer-readable storage media (CRSM), electronic circuitry, an application specific integrated circuit (ASIC), or other suitable constituency. The document encoding module 506 may operate on a user device 102, the server 122, or another computing device. The document encoding module 506 processes the tagged document 502 so as to identify and extract the tagged portions of sensitive information—that is, the data values 116—and their respective security levels, and to populate a data structure 508 therewith.

The data structure 508 includes respective rows of associated elements. Each row includes a token 510, a data value 116 associated with that token 510, and a security policy 512 associate with that data value 116. For example, the first row includes a token 510 of "AMZ1.TOKEN.ABC", the data value 116 of "2,755", and the security policy 512 of "2". Likewise for the other two portions of sensitive information. The data structure 508 may be stored on the server 122, or in another suitable, access-secured computing device.

Each security policy 512 may be defined by one or more criteria. Non-limiting examples of such criteria include a minimal user security level, specifically named authorized users 104, geographic limitations on viewing the associated data value(s) 116, a cumulative viewing time or number of viewing sessions that are permitted, permitted devices or platforms for viewing the associated data value(s) 116, and so on. As depicted for non-limiting example, a security policy 512(1) of "3" requires a user security level of 3 or greater, that the user 104 must view the data value(s) 116 while on company property, and that any suitably equipped user device 102 is permitted. Other security policies 512 of varying complexity or criteria may also be used.

The document encoding module 506 may also be configured to generate unique, single-use tokens 510. As such, each token 510 is generated and used only once in accordance with some predetermined generating scheme that is analogous, for example, to generating serial numbers and the like. Other token generating methods may also be used. The document encoding module 506 then replaces each portion of sensitive information and the tagging notation with the corresponding token 510. An encoded document 514 having encoded document content 516 is generated accordingly, and is provided to the user 104 for printing, distribution, and so on.

The tokens 510 are depicted as textual strings in accordance with an illustrative and non-limiting format. In another implementation, each sensitive piece of information is replaced with a box having a token 510 therein, where the box occupies sufficient area in the encoded document 514 to accommodate presentation of the corresponding data value 116. That is, the resulting printed document (e.g., 110) would include user-readable portions, and encoded portions represented by boxes or areas of varying sizes with respective tokens 510 therein.

In this way, sufficient space has been allocated for placement of the original data values 116 when the printed document 110 is decoded and the user-readable content 112 is presented to the user 104. Thus, the user-readable content 112 may be presented as a virtual image of the printed document 110, preserving font sizes, line spacing, or other characteristics, and having the data values 116 replacing the printed boxes and tokens 510, accordingly.

In another implementation, the tokens 510 may be varied in font size or include blank space before and after so as to accommodate the corresponding data values 116 during presentation of the user-readable content 112 as a virtual image of the printed document 110. In still another implementation, the tokens 510 may be generated and provided as icons or graphic images of varying dimensions and so forth, toward accomplishing the same end. Other token 510 placement or usage methods may also be used.

Figure 6:
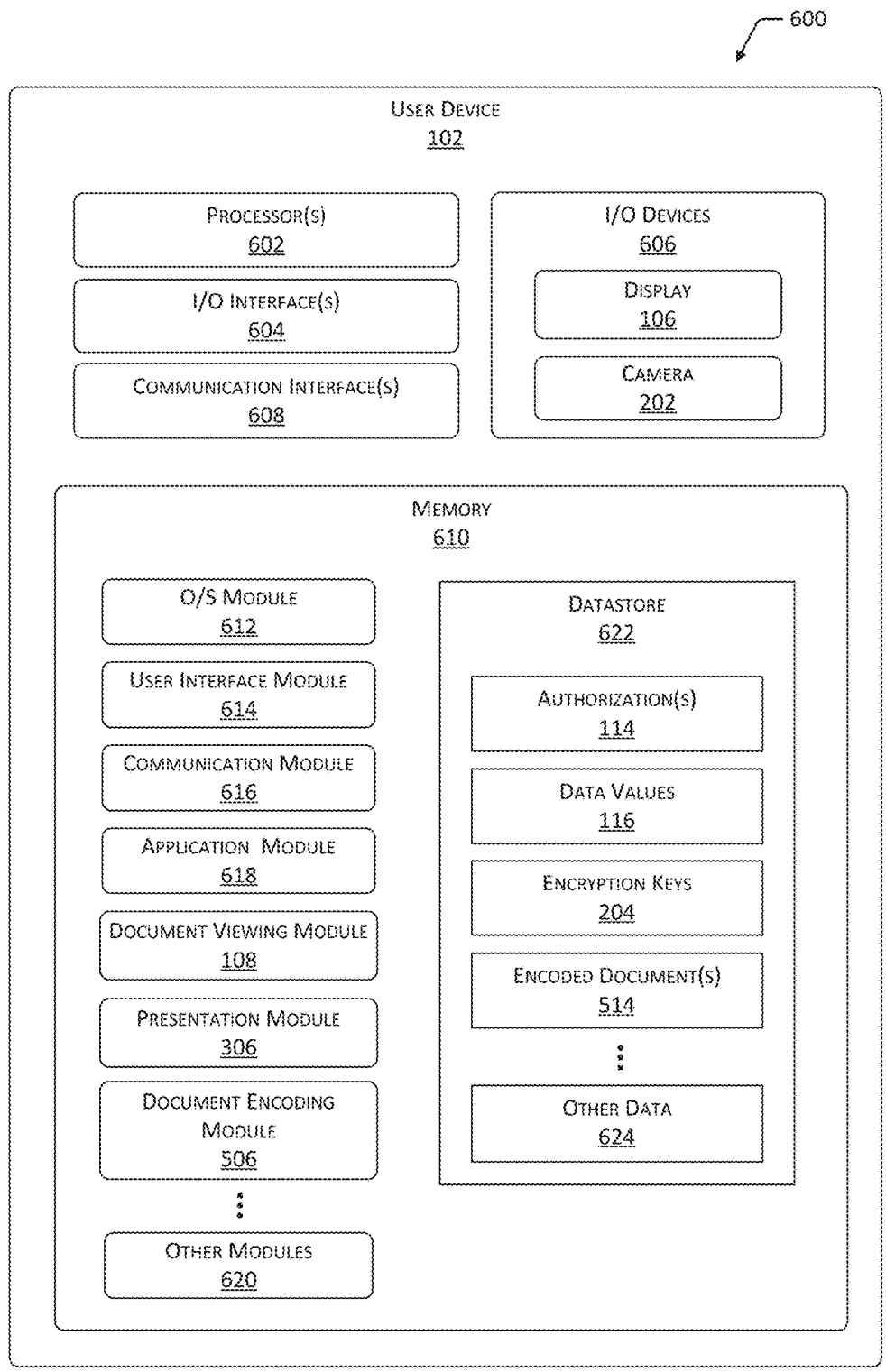
FIG. 6 is a block diagram of a user device configured to present user-readable content from an encoded document.

FIG. 6 illustrates a block diagram 600 of a user device 102. The user device 102 may be any of the user devices 102 depicted and described herein, or another suitable apparatus. Other user devices 102 may include analogous or respectively varying constituency or configurations, accordingly. The user device 102 may include one or more processors 602 configured to execute one or more stored instructions. The processor(s) 602 may comprise one or more cores. The user device 102 may include one or more I/O interface(s) 604 to allow the processor(s) 602 or other portions of the user device 102 to communicate with other user devices 102, the server 122, other computing device(s), and so on. The I/O interfaces 604 may comprise I2C, SPI, USB, RS-232, SSL, TLS, and so forth.

The I/O interface(s) 604 may couple to one or more I/O devices 606. The I/O devices 606 may include input devices such as the camera 202, one or more of a keyboard, mouse, and so forth. The I/O devices 606 may also include output devices such as the display 106, audio speakers, haptic output devices, and so forth. In some embodiments, the I/O devices 606 may be physically incorporated within the user device 102, or may be externally placed.

The user device 102 may also include one or more communication interfaces 608. The communication interfaces 608 are configured to provide communications between the user device 102 and other user devices 102, the server 122, computing devices, routers, access nodes, web-accessible resources, and so forth. The communication interfaces 608 may include wireless capabilities, or devices configured to couple to one or more networks including PANs, LANs, WLANs, WANs, and so forth. The user device 102 may also include one or more busses or other internal communications hardware or software that allow for the transfer of data between the various modules and components of the user device 102.

As shown in FIG. 6, the user device 102 includes one or more memories 610. The memory 610 comprises one or more computer-readable storage media (CRSM). The memory 610 provides storage of computer readable instructions, data structures, program modules and other data for the operation of the user device 102.

The memory 610 may include at least one operating system (OS) module 612. The OS module 612 is configured to manage hardware devices such as the I/O interfaces 604, the I/O devices 606, the communication interfaces 608, and provide various services to applications or modules executing on the processors 602. Also, stored in the memory 610 may be one or more of the following modules. These modules may be executed as foreground applications, background tasks, daemons, and so forth.

A user interface module 614 may be configured to provide one or more application programming interfaces. The user interface module 614 may also provide data to the user device 102 that is configured to open or retrieve files, enable the rendering of webpages or their contents, or as needed for other operations, such as hypertext markup language ("HTML") files. The user interface module 614 is configured to accept inputs and send outputs using the I/O interfaces 604, the communication interfaces 608, or both.

A communication module 616 is configured to support communication with the user device 102, other user devices 102 or entities, the server 122, routers, and so forth using the one or more networks 124. In some implementations, the communication module 616 may support encrypted communications. For example, hypertext transport protocol secured ("HTTPS") or transport layer security ("TLS") may be supported.

The memory 610 may also include one or more application modules 618. The application modules 618 may be configured or modified, and selectively provided to or received from other user devices 102, the server 122, other computing devices, and so on. Thus, various devices can be updated or enhanced as new application modules 618 are generated, existing application modules 618 are amended or improved, and so on. The application modules 618 may respectively perform word processing, spreadsheet operations, respective business tasks, technical functions or control, or other functions in accordance with corresponding program code (i.e., software).

The memory 610 may also include the document viewing module 108 or respective variations thereof, as described above. The memory 610 may also include the presentation module 306, or variations thereof, as described above. The memory 610 may also include the document encoding module 506, or variations thereof, as described above.

The memory 610 may further include other modules 620 respectively configured to perform other functions of the user device 102. For non-limiting example, the other modules 620 may include one or more respective web browsers enabling access to or presentation of respective webpages provided by the server 122, other computing devices, network search functions, and so forth.

The memory 610 may also include a datastore 622 to store data and information. The datastore 622 may use a flat file, database, linked list, tree, executable code, or other data structure to store the information. In some implementations, the datastore 622 or a portion of the datastore 622 may be distributed across one or more other devices including servers, network attached storage devices and so forth.

As depicted, the datastore 622 may store one or more of the authorizations 114, as used to request decoding services from the server 122. Each authorization 114 may be provided as a digital certificate, an encrypted code or password, or in another suitable form. The datastore 622 may also include one or more of the data values 116, as used to replace respective tokens 510 during decoding of the encoded content 118 of a printed document 110. The datastore 622 may further include one or more encryption keys 204, as used during decoding of the encoded content 208 of the printed document 206.

The datastore 622 may further store one or more encoded documents 514 as described above. Other data 624 may also be stored in the datastore 622. For example, the other data 624 may include (temporarily) one or more decoded documents 406, user-readable contents 112 or 214, account information, access codes to respective servers 122, URLs to respective services accessible over the network(s) 124, and so forth.

Figure 7:
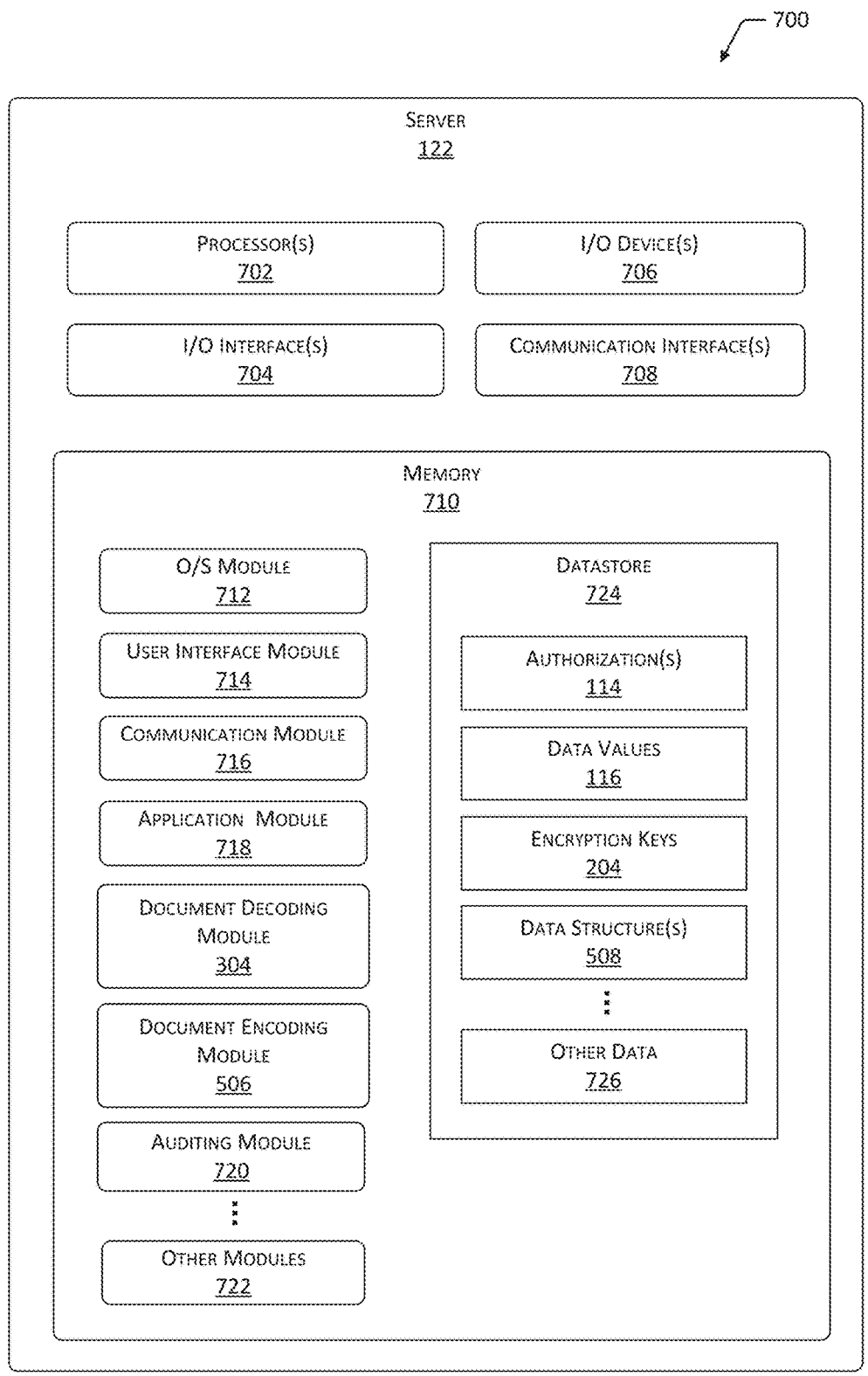
FIG. 7 is a block diagram of a server and its respective elements.

FIG. 7 illustrates a block diagram 700 of a server 122. The server 122 may be as depicted and described herein, or suitably varied or provided as another suitable apparatus. Other servers 122 may include analogous or respectively varying constituency or configurations, accordingly. The server 122 may include one or more processors 702 configured to execute one or more stored instructions. The processor(s) 702 may comprise one or more cores. The server 122 may include one or more I/O interface(s) 704 to allow the processor(s) 702 or other portions of the server 122 to communicate with the user devices 102, other servers 122, other computing device(s), and so on. The I/O interfaces 704 may comprise I2C, SPI, USB, RS-232, and so forth.

The I/O interface(s) 704 may couple to one or more I/O devices 706. The I/O devices 706 may include input devices such as one or more of a keyboard, mouse, and so forth. The I/O devices 706 may also include output devices such as a display, audio speakers, haptic output devices, and so forth. In some embodiments, the I/O devices 706 may be physically incorporated within the server 122, or may be externally placed.

The server 122 may also include one or more communication interfaces 708. The communication interfaces 708 are configured to provide communications between the server 122 and the user devices 102, other server(s) 122, computing devices, routers, access points, web-accessible resources, and so forth. The communication interfaces 708 may include wireless capabilities, or devices configured to couple to one or more networks 124 including PANs, LANs, WLANs, WANs, and so forth. The server 122 may also include one or more busses or other internal communications hardware or software that allow for the transfer of data between the various modules and components of the server 122.

As shown in FIG. 7, the server 122 includes one or more memories 710. The memory 710 comprises one or more computer-readable storage media (CRSM). The memory 710 provides storage of computer readable instructions, data structures, program modules and other data for the operation of the server 122.

The memory 710 may include at least one operating system (OS) module 712. The OS module 712 is configured to manage hardware devices such as the I/O interfaces 704, the I/O devices 706, the communication interfaces 708, and provide various services to applications or modules executing on the processors 702. Also, stored in the memory 710 may be one or more of the following modules. These modules may be executed as foreground applications, background tasks, daemons, and so forth.

A user interface module 714 may be configured to provide one or more application programming interfaces. The user interface module 714 may also provide data to the server 122 that is configured to open or retrieve files, enable the rendering of webpages or their contents, or as needed for other operations, such as hypertext markup language ("HTML") files. The user interface module 714 is configured to accept inputs and send outputs using the I/O interfaces 704, the communication interfaces 708, or both.

A communication module 716 is configured to support communication with user devices 102, other devices or entities, another server 122, routers, and so forth, by way of the one or more networks 124. In some implementations, the communication module 716 may support encrypted communications. For example, hypertext transport protocol secured ("HTTPS") or transport layer security ("TLS") may be supported.

The memory 710 may also include one or more application modules 718. The application modules 718 may be configured or modified, and selectively provided to or received from another server 122, the user devices 102, other computing devices, and so on. Thus, various apparatus can be updated or enhanced as new application modules 718 are generated, existing application modules 718 are amended or improved, and so on. The application modules 718 may respectively perform different business tasks, database management, technical operations, or other functions in accordance with corresponding program code (i.e., software).

The memory 710 may also include the document decoding module 304 or respective variations thereof, as described above. The memory 710 may also include the document encoding module 506, or variations thereof, as described above. The memory 710 may also include an auditing module 720. The auditing module 720 may include executable program code stored on CRSM, non-volatile storage media, electronic circuitry, one or more ASICs, and so forth. The auditing module 720 is configured to determine and record information regarding user 104 access to encoded content 118, 208, and the like. For example, the auditing module 720 may track all different users 104 to whom encryption keys 204 or data values 116 are sent, the identity of the users 104 making requests without correct authorization, the particular printed documents 110, 206, and so on that are the subject of these requests, and so forth. The auditing module 720 may also keep track of the respective geographic locations of users 104 or the dates and times of such requests, frequency of user 104 access or attempts thereof, or other information.

The memory 710 may further include other modules 722 respectively configured to perform other functions of the server 122. For non-limiting example, the other modules 722 may include one or more respective applications enabling secured access to the server 122 by respective user devices 102, applications configured to generate webpages provided by server 122, and so forth.

The memory 710 may also include a datastore 724 to store data and information. The datastore 724 may use a flat file, database, linked list, tree, executable code, or other data structure to store the information. In some implementations, the datastore 724 or a portion of the datastore 724 may be distributed across one or more other devices including servers 122, network attached storage devices, and so forth.

As depicted, the datastore 724 may store one or more of the authorizations 114 as received from respective ones of the user devices 102. The datastore 724 may also include one or more of the data values 116 as described above. The datastore 724 may further include one or more of the encryption keys 204, as used during decoding of encoded (encrypted) content 208.

The datastore 724 may also include one or more respective data structures 508. Each data structure 508 may include data values 116, tokens 510, security levels 512, or other information generated or assembled during encoding of the tagged document 502. Other data 726 may also be stored in the datastore 724. For example, the other data 726 may include account information, access codes, URLs for routing communications to respective user devices 102, and so forth.

Figure 8:
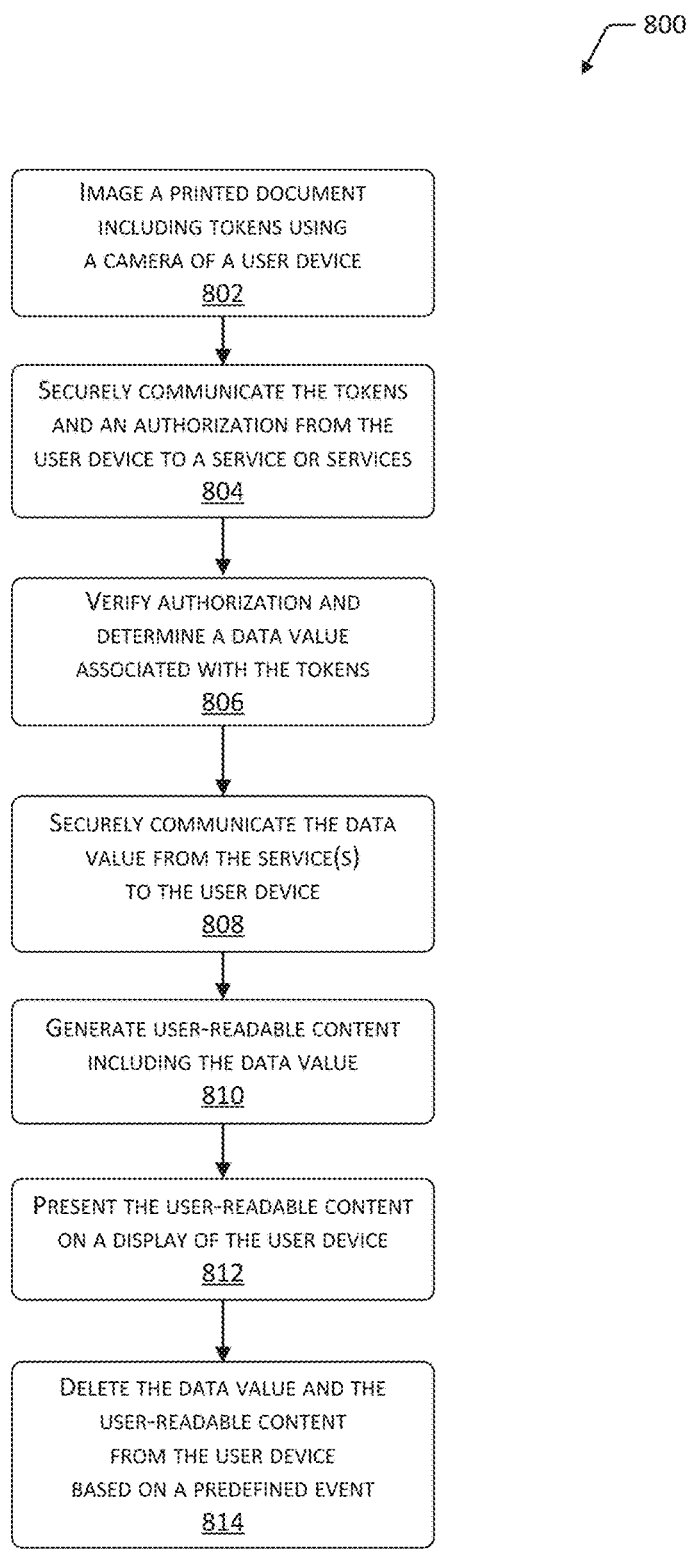
FIG. 8 is a flow diagram of an illustrative process of decoding a printed document having a token representing an encoded portion of information.

FIG. 8 is a flow diagram 800 illustrating a process that includes decoding a printed document 110 having tokens 510 representing encoded portions of sensitive information. In some implementations, this process may be implemented by way of the user device 102, the server 122, and their respective resources. The process of the flow diagram 800 is illustrative and non-limiting, and other processes including one or more other steps, omitting one or more of the depicted steps, or proceeding in other orders of execution, may also be used.

Block 802 images a printed document 110 including tokens 510 using a camera 202 of a user device 102. For purposes of a present example, the user 104 uses a user device 102 to capture a digital image of the printed document 110. The printed document 110 includes encoded content 118, where sensitive pieces of information are represented by respective tokens 510.

Block 804 securely communicates the tokens 510 and an authorization 114 from the user device 102 to a service or services. In the present example, the document viewing module 108 identifies the tokens 510 within the image of the printed document 110, and bundles them with the authorization 114 as the message 120. The message 120 is then securely communicated to the server 122 by way of the network(s) 124. The server 122 is configured to implement one or more services.

Block 806 verifies the authorization 114 and determines a data value 116 associated with the tokens 510. In the present example, the document decoding module 304 of the server 122 verifies the authorization 114. Specifically, the server 122 confirms that the user 104 is authorized in accordance with a security policy 512 of "3", as stored within the data structure 508. The document decoding module 304 then accesses the data structure 508 and retrieves the data values 116 associated with the tokens 510. For instance, one of the tokens 510 has the value "AMZLTOKEN.GHI". The associated data value 116, "David Smith", is thus retrieved from the data structure 508, and so on.

Block 808 communicates the data values 116 from the service or services to the user device 102. In the present example, the document decoding module 304 of the server 122 communicates the data value 116(2) to the document viewing module 108 of the user device 102.

Block 810 generates user-readable content 112 including the data values 116(2). In the present example, the document viewing module 108 generates user-readable content 112 including the user-readable portions of the printed document 110. The document viewing module 108 also replaces the tokens 510 with the data values 116—such as "David Smith"—within the user-readable content 112.

Block 812 presents the user-readable content 112 on a display 106 of the user device 102. In the present example, the document viewing module 108 provides the just-generated user-readable content 112 to the presentation module 306. In turn, the presentation module 306 signals or drives the display 106 so as to present the user-readable content 112 to the user 104.

Block 814 deletes the data value 116 and the user-readable content 112 from the user device 102 based on a predefined event. Concluding the present example, the document viewing module 108 deletes the data values 116 and the user-readable content 112 from the user device 102 after a single viewing session by the user 104. Moreover, the document decoding module 304 of the server 122 may be configured to prevent the particular user 104 from accessing the data values 116 after the first instance, in the interest of greater security. Other security methods or steps may also be used or performed. In one instance, the data values 116 and the user-readable content 112 are deleted from the user device 102 upon detecting that the user 104 has departed from an office site or other geographic location.

Figure 9:
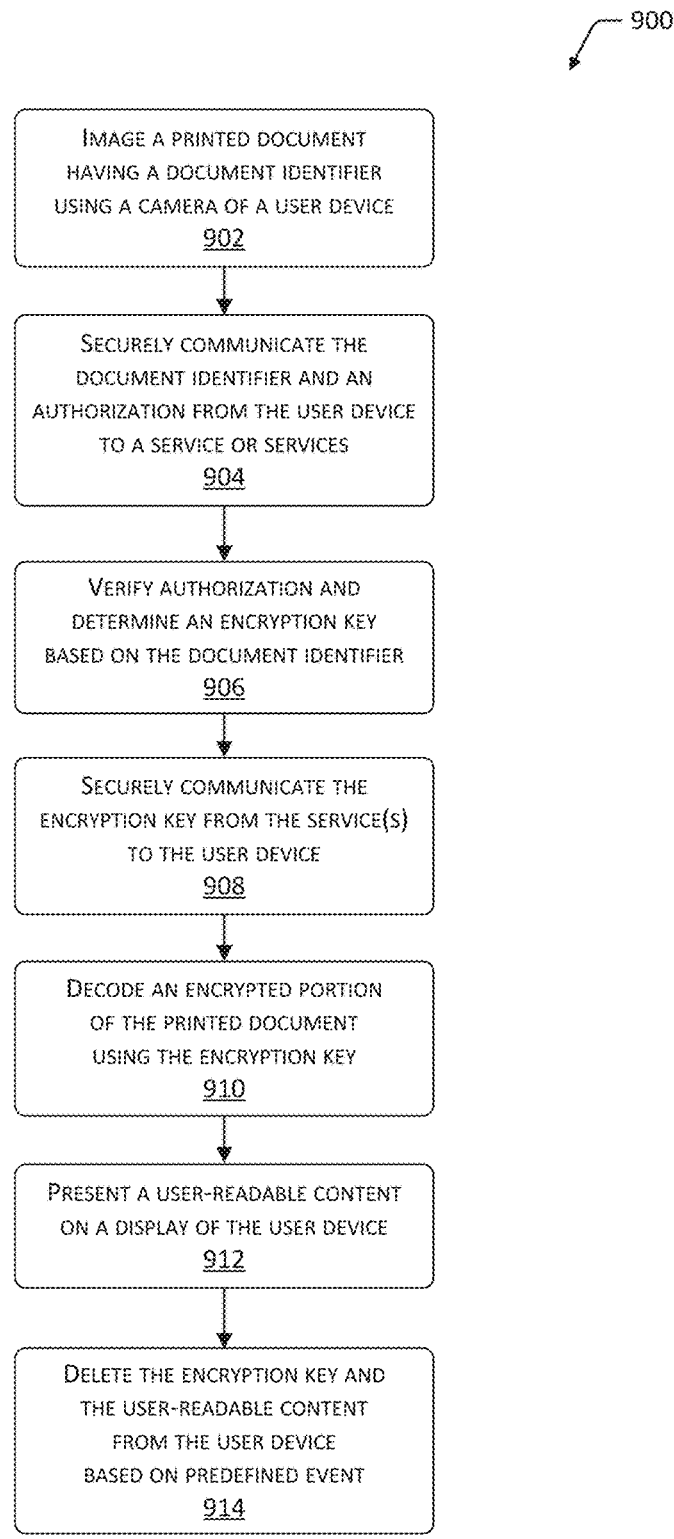
FIG. 9 is a flow diagram of an illustrative process of decoding a printed document having an encrypted portion of information.

FIG. 9 is a flow diagram 900 including decoding a printed document 206 that includes portions of sensitive information that are encrypted. In some implementations, this process may be implemented by way of the user device 102, the server 122, and their respective resources. The process of the flow diagram 900 is illustrative and non-limiting, and other processes including one or more other steps, omitting one or more of the depicted steps, or proceeding in other orders of execution, may also be used.

Block 902 images a printed document 206 having a document identifier 210 using a camera 202 of a user device 102. For purposes of a present example, the user 104 receives the printed document 206 from its originator. The user 104 then acquires a digital image of the printed document 206 using the camera 202 of the user device 102, which is a wearable computing device for purpose of this illustration.

Block 904 communicates the document identifier 210 and an authorization 114 from the user device 102 to a service or services. In the present example, the document viewing module 108 of the user device 102 identifies the document identifier 210 within the digital image and bundles it with the authorization 114. The document viewing module 108 then communicates the authorization 114 and the document identifier 210 as the message 212 to the server 122 by way of the one or more networks 124. The server 122 is configured to implement one or more services.

Block 906 verifies the authorization 114 and determines an encryption key 204 based on the document identifier 210. In the present example, the document decoding module 304 of the server 122 receives the message 212 and verifies the authorization 114 of the user 104. Specifically, the authorization 114 is checked against a security level (e.g., 512) previously established for the document identifier 210 and stored within a data structure (e.g., 508). Thereafter, the document decoding module 304 retrieves an encryption key 204 associated with the document identifier 210 from the corresponding data structure 508.

Block 908 securely communicates the encryption key 204 from the service or services to the user device 102. In the present example, the document decoding module 304 securely communicates or sends the just-retrieved encryption key 204 from the server 122 to the document viewing module 108 of the user device 102.

Block 910 decodes an encrypted portion of the printed document 206 using the encryption key 204. In the present example, the document viewing module 108 uses the encryption key 204 to decode, or decrypt, one or more encoded portions of the printed document 206. For instance, the just-received encryption key 204 may be used to decode the 3 depicted encoded portions "7ZE#p", "K;2" and "9UwC*s" as "2,755", "16%" and "$3.44 M", respectively.

Block 912 presents user-readable content 214 on a display 106 of the user device 102. In the present example, the document viewing module 108 generates user-readable content 214 that includes user-readable portions acquired from the printed document 206, and the 3 decoded portions derived at 910 above. The user-readable content 214 is therefore fully decoded for viewing by the user 104. The document viewing module 108 then provides the user-readable content 214 to a presentation module 306, which presents the user-readable content 214 on the display 106.

Block 914 deletes the encryption key 204 and the user-readable content 214 from the user device 102 based on predefined event. In the present example, the document viewing module 108 may be configured to present the user-readable content 214 during 3 separate and distinct viewing sessions. Thereafter, the document viewing module 108 deletes the encryption key 204 and the user-readable content 214 from the user device 102, such that it cannot be reconstructed. In turn, the document decoding module 304 of the server 122 may be configured to prevent the particular user 104 from acquiring the encryption key 204 after the first instance. Other security methods or steps may also be used or performed.

Figure 10:
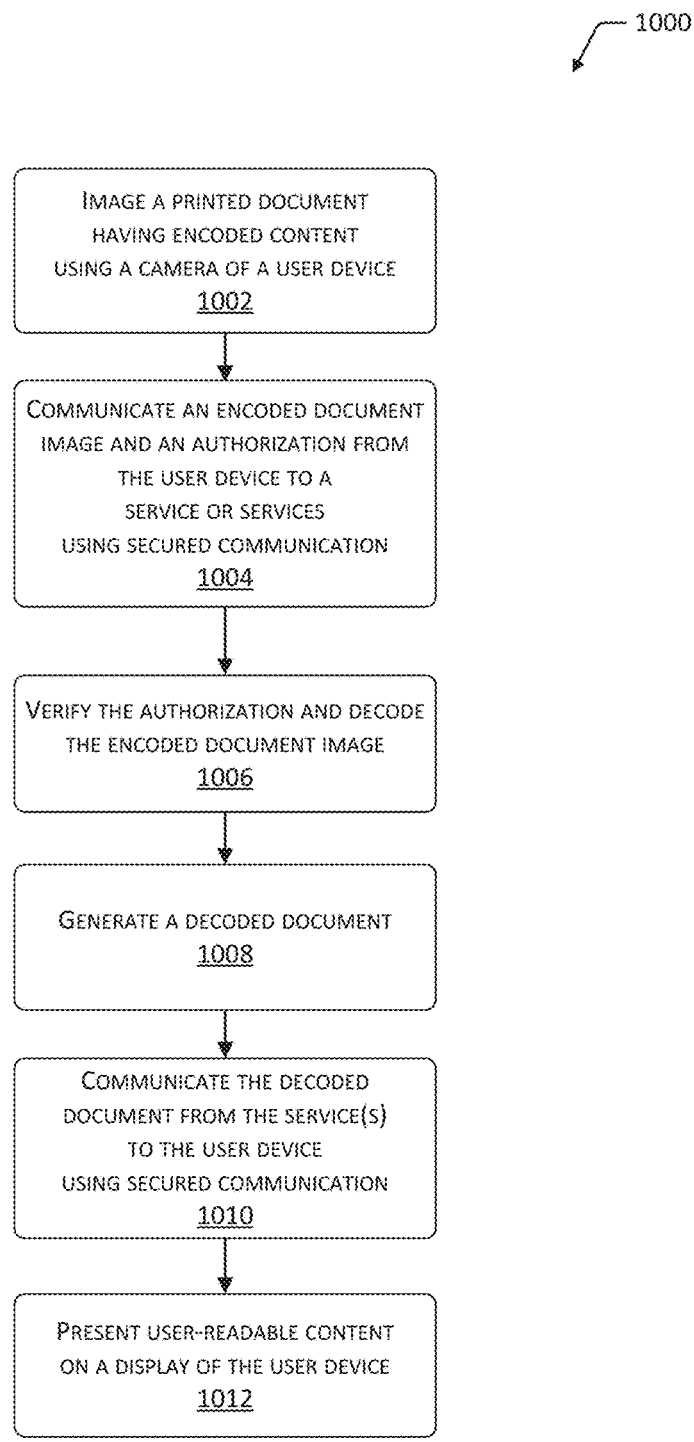
FIG. 10 is a flow diagram of an illustrative process of decoding an encoded document image and providing a decoded document.

FIG. 10 is a flow diagram 1000 including decoding a printed document 206 that includes encoded content 208 by way of encryption. In some implementations, this process may be implemented by way of the user device 102, the server 122, and their respective resources. The process of the flow diagram 1000 is illustrative and non-limiting, and other processes including one or more other steps, omitting one or more of the depicted steps, or proceeding in other orders of execution, may also be used.

Block 1002 images a printed document 206 having encoded content 208 using a camera 202 of a user device 102. For purposes of a present example, the user 104 receives the printed document 206 and acquires a digital image thereof using the camera 202 of the user device 102. Thus, an encoded document image 404 is generated.

Block 1004 communicates the encoded document image 404 of the printed document 206 and an authorization 114 from the user device 102 to a service or services. In the present example, the document viewing module 108 of the user device 102 communicates the encoded document image 404 and the authorization 114 to the server 122 by way of the one or more networks 124. The server 122 is configured to implement one or more services.

Block 1006 verifies the authorization 114 and decodes the encoded document image 404. In the present example, the document decoding module 304 of the server 122 receives the authorization 114 and the encoded document image 404. The document decoding module 304 then verifies the authorization 114 against a predetermined security policy 512, or in some other suitable way. The document decoding module 304 thereafter decodes the encoded portions of the encoded document image 404, which for purposes of illustration are encrypted strings of text. One or more encryption keys 204 are used during the decoding process.

Block 1008 generates a decoded document 406. In the present example, the document decoding module 304 uses the decoded portions of the encoded document image 404, and user-readable portions therefrom, to generate the decoded document 406. For instance, the decoded document 406 is formatted using the same font, line spacing, and other appearance characteristics of the printed document 206, having user-readable text or matter in place of the encoded portions. Thus, the decoded document 406 may be a virtual image of the printed document 206 in decoded form.

Block 1010 securely communicates the decoded document 406 from the service or services to the user device 102. In the present example, the document decoding module 304 of the server 122 sends the decoded document 406 to the user device 102 using the network(s) 124. Secured communication protocol such as SSL, TLS, or another technique may be used.

Block 1012 presents user-readable content 214 on a display 106 of the user device 102. In the present example, the document viewing module 108 receives the decoded document 406 from the server 122, and processes it to generate user-readable content 214. The user-readable content 214 is then presented on the display 106 of the user device 102. In one instance, the document viewing module 108 may preserve the appearance characteristics or "look and feel" of the decoded document 406 such that a fully-decoded, virtual image of the printed document 206 is presented. Other presentation methods may also be used.

Figure 11:
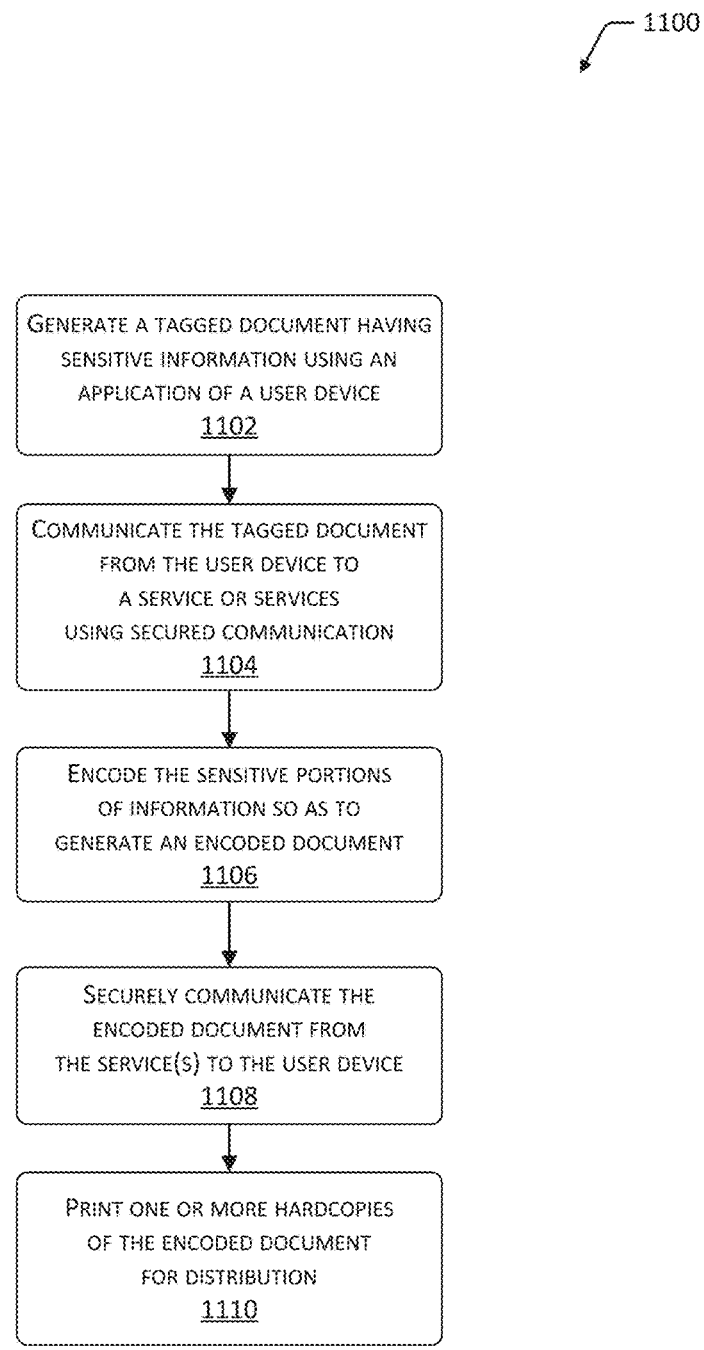
FIG. 11 is a flow diagram of an illustrative process of generating an encoded document from a tagged document.

FIG. 11 is a flow diagram 1100 including the generation of an encoded document. In some implementations, this process may be implemented by way of the user device 102, the server 122, and their respective resources. The process of the flow diagram 1100 is illustrative and non-limiting, and other processes including one or more other steps, omitting one or more of the depicted steps, or proceeding in other orders of execution, may also be used.

Block 1102 generates a tagged document 502 having sensitive information using an application 618 of a user device 102. For purposes of the present example, the user 104 uses an application 618, such as a word processor, on a user device 102 to produce a document having sensitive pieces of information therein. For example, such a tagged document 502 may discuss revenue or sales volume for a reporting period. The user 104 uses predetermined notations to tag or denote sensitive portions of information, such that the tagged document 502 is generated, having tagged document content 504.

Block 1104 securely communicates the tagged document 502 from the user device 102 to a service or services. In the present example, the user device 102 sends the tagged document 502 to the server 122 by way of the network(s) 124. The user device 102 may also include a request for encoding the tagged document 502 using tokens 510 to represent the sensitive portions of information. The tagged document 502 is received by the document encoding module 506 of the server 122. The server 122 is configured to implement one or more services.

Block 1106 encodes the sensitive portions of information so as to generate an encoded document 514. In the present example, the document encoding module 506 identifies the tagged portions of information—that is, respective data values 116, generating a unique token 510 associated with each. The document encoding module 506 further identifies respective security levels 512, if any, as indicated for each tagged portion of information. The document encoding module 506 then populates the data structure 508 using the tokens 510, the respectively associated data values 116, and the security levels 512. The document encoding module 506 then generates the encoded document 514, where the respective tokens 510 replace the corresponding portions of sensitive information.

Block 1108 securely communicates the encoded document 514 from the service or services to the user device 102. In the present example, the document encoding module 506 of the server 122 securely communicates the encoded document 514 to the user device 102. The encoded document 514 may be stored therein for future use, and so forth.

Block 1110 prints one or more hardcopies of the encoded document 514 for distribution. In the present example, the user 104 causes the user device 102 to print some number of printed documents 110 in accordance with the encoded document 514. A local or network printer may be used, and so on. Each printed document 110 includes encoded content 118, having the respective tokens 510 as placeholders for the associated data values 116. These printed documents 110 may be distributed as desired without concern for the security of the sensitive information encoded therein.

Those having ordinary skill in the art will readily recognize that certain components, steps, or operations illustrated in the figures above can be eliminated, taken in an alternate order, or otherwise rearranged. Moreover, the methods described above may be implemented as one or more software programs for a computer system and are encoded in a computer-readable storage medium as instructions executable on one or more processors.

The computer-readable storage medium (CRSM) can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

One or more operations described as being performed on a particular device or apparatus may be performed by another device or apparatus within a system relationship. Additionally, one or more respective operations may be decentralized from a specific apparatus and distributed across different devices within a network or web-based architecture. Thus, respective operations and functions as illustrated or described above may be performed by various entities in cooperative relationship with each other. Those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A user device configured to:
cause a printed document to be imaged using an image capture device of the user device, wherein the printed document includes encoded content, a first portion of the encoded content is represented by a first token associated with a first security level, a second portion of the encoded content is represented by a second token associated with a second security level, and the encoded content represents sensitive information;
identify the first token and the second token within the image of the printed document;
cause an authorization and the first token and the second token to be transmitted to at least one computing device configured to implement one or more services, wherein the one or more services are configured to use the authorization to verify that a user is privileged to access the sensitive information represented by the first token and the second token, and wherein the one or more services are further configured to retrieve a stored data value associated with the first token and the second token;

receive the stored data value associated with the first token and the second token;

generate user-readable content including content acquired from the image of the printed document and the stored data value; and cause the user-readable content to be presented using a display associated with the user device.

2. The user device of claim 1, wherein the encoded content is replaced with the stored data value during the generation of the user-readable content.

3. The user device of claim 1, wherein:
the authorization includes a user security level equal to or greater than the first security level and lesser than the second security level.

4. The user device of claim 1, wherein the user device is further configured to delete the stored data value and the user-readable content in response to either a predefined date, or a predefined number of presentations of the user-readable content.

5. A method performed at least in part by an apparatus, the method comprising:

causing content to be acquired from a printed document, wherein the printed document includes one or more encoded portions, the one or more encoded portions include a first portion associated with a first security level and a second portion associated with a second security level;

causing at least a portion of the acquired content and an authorization to be transmitted to at least one computing device configured to implement one or more services, wherein the one or more services are configured to use the authorization that includes a user security level that is equal to or greater than the first security level to verify that a corresponding user is privileged to at least access sensitive information represented by the first portion, and wherein the one or more services are further configured to access the sensitive information based on the acquired content;

receiving the sensitive information from the one or more services; and causing user-readable content to be presented on a display, wherein the user-readable content is based at least in part on the received sensitive information and includes one or more user-readable portions corresponding to the encoded portions within the printed document.

6. The method of claim 5, wherein the one or more encoded portions are represented by one or more tokens within the printed document, the method further comprising:

sending the one or more tokens to the one or more services;

receiving data values associated with respective ones of the one or more tokens from the one or more services; and generating, using the data values, the user-readable content.

7. The method of claim 5, wherein the one or more encoded portions are encrypted within the printed document, and wherein the printed document further includes a document identifier, the method further comprising:

sending the document identifier to the one or more services;

receiving, from the one or more services, one or more encryption keys associated with the one or more encoded portions; and generating, using the one or more encryption keys, the user-readable content.

8. The method of claim 5, further comprising:
sending an entire image of the printed document to the one or more services; and receiving a decoded document from the one or more services, the decoded document including at least some of the user-readable content.

9. The method of claim 5, wherein the one or more encoded portions are represented by respective encrypted portions within the printed document, the method further comprising:

sending the encrypted portions to the one or more services;

receiving data values associated with respective ones of the encrypted portions from the one or more services; and generating, using the data values, the user-readable content.

10. The method of claim 5, wherein the user-readable content is presented on the display during a viewing session, the method further comprising:

deleting, from the apparatus, the user-readable content and the sensitive information when the viewing session is ended.

11. The method of claim 5, wherein causing the content to be acquired from the printed document comprises:

causing a microphone associated with the apparatus to acquire user speech input; or causing an image capture device of the apparatus to acquire the printed document.

12. The method of claim 5, wherein:
the one or more encoded portions are associated with a predefined security policy; and the authorization includes the user security level equal to or greater than that required by the predefined security policy.

13. The method of claim 5, wherein the user security level is lesser than the second security level, the method further comprising:

receiving a decoded version of the first portion from the one or more services; and generating the user-readable content including the decoded version of the first portion, the user-readable content also including either an encoded version of the second portion or a placeholder.

14. A non-transitory computer-readable storage media including one or more instructions, the one or more instructions configured to cause one or more processors to:

cause first information to be sent to a support service, wherein the first information includes content acquired from a printed document, and wherein the printed document includes an encoded portion that defines at least a first encoded portion and a second encoded portion, and a non-encoded portion, and wherein the first encoded portion and the second encoded portion are associated with user security levels;

receive second information from the support service; and cause, using the second information, user-readable content to be presented on a display, wherein the user-readable content includes the non-encoded portion of the printed document, and wherein the user-readable content includes a decoded version of the encoded portion of the printed document.

15. The non-transitory computer-readable storage media of claim 14, the one or more instructions are further configured to cause the one or more processors to:
   acquire, using a camera, an image of the printed document; and
   include at least some of the image of the printed document with the first information.

16. The non-transitory computer-readable storage media of claim 14, wherein the encoded portion is represented by a token within the printed document, the one or more instructions are further configured to cause the one or more processors to:
   include the token with the first information; and
   receive the decoded version of the encoded portion with the second information.

17. The non-transitory computer-readable storage media of claim 16, wherein the token is a graphical symbol within the printed document.

18. The non-transitory computer-readable storage media of claim 14, wherein the encoded portion is represented by encrypted text within the printed document, the one or more instructions are further configured to cause the one or more processors to:
   include the encrypted text with the first information;
   receive an encryption key with the second information; and
   generate, using the encryption key, the decoded version of the encoded portion.

19. The non-transitory computer-readable storage media of claim 14, wherein the second information includes the decoded version of the encoded portion.

20. The non-transitory computer-readable storage media of claim 14, wherein the one or more instructions are further configured to cause the one or more processors to:
   include a user security level with the first information, wherein the user security level permits decoding of the first encoded portion, and wherein the user security level does not permit decoding of the second encoded portion; and
   include a decoded version of the first encoded portion with the user-readable content presented on the display and the second encoded portion with the user-readable content presented on the display.

* * * * *